United States Patent [19]

Schöll

[11] 4,139,056
[45] Feb. 13, 1979

[54] METHOD OF AND SYSTEM FOR STORING HEAT

[76] Inventor: Günter Schöll, Via Orselina, Locarno-Muralto, Switzerland, CH-660

[21] Appl. No.: 604,782

[22] Filed: Aug. 14, 1975

[30] Foreign Application Priority Data

Aug. 14, 1974 [DE] Fed. Rep. of Germany ....... 2439028

[51] Int. Cl.² .......................................... F28D 13/00
[52] U.S. Cl. ............................... 165/104 S; 126/400; 165/45
[58] Field of Search ............... 126/271, 400; 165/45, 165/104 S, DIG. 4

[56] References Cited

U.S. PATENT DOCUMENTS

| 695,136 | 3/1902 | Baker | 126/271 |
|---|---|---|---|
| 3,105,137 | 9/1963 | Sullivan | 165/DIG. 4 |
| 3,314,414 | 4/1967 | Rowekamp | 126/271 |
| 3,464,486 | 9/1969 | Rice | 126/400 |
| 3,485,216 | 12/1969 | Lawrence | 126/400 |
| 3,605,720 | 9/1971 | Mayo | 126/400 |
| 3,799,145 | 3/1974 | Butterfield | 237/1 A |
| 3,910,253 | 10/1975 | Thomason | 126/271 |

Primary Examiner—Martin P. Schwadron
Assistant Examiner—Abraham Hershkovitz
Attorney, Agent, or Firm—Karl F. Ross

[57] ABSTRACT

A reservoir is subdivided by a plurality of partitions into a plurality of water-filled compartments. The lower region of at least one of the compartments is connectable to a source of cool water and the upper region of at least one other compartment is usable as a supply of relatively warm water. Relatively cool water may also be withdrawn from the one compartment, heated and introduced into the upper region of the other compartment. The partitions may form conduits opening at one end into the upper region of the compartments to one side of the partition and at the other end into the lower region of the compartment on the other side so that warm water may flow through this partition from the top of one compartment to the bottom of the next compartment or cool water may flow from the bottom of one compartment up and into the top of the next compartment.

1 Claim, 4 Drawing Figures

METHOD OF AND SYSTEM FOR STORING HEAT

FIELD OF THE INVENTION

The present invention relates to a system for storing heat. More particularly this invention concerns a reservoir system for holding water whose heat capacity is used for heat-energy storage.

BACKGROUND OF THE INVENTION

It is known to store heat energy by means of a large water-containing vessel or reservoir. The heat of the water in this reservoir is kept in by means of an insulating cover floating on the reservoir and usually made of a synthetic-resin sheet with appropriate flotation. The cover prevents the loss of heat to the air and evaporation of the water.

In use cold water is introduced at the bottom of the reservoir and hot water may be drained off the top. During the summer or daylight hours hot water may be added to the top and cold water removed at the bottom, and during the winter or evening hours hot water may be drawn off the top and cold water introduced at the bottom. It is known to circulate the water from the top to the bottom through a solar heat exchanger or energy collector such as described in my copending patent application Ser. No. 488,771 filed July 15, 1974 (now abandoned).

With such a heat-storing system the amount of heat energy lost is generally proportional to the area of the upper surface of the body of water. Such losses even in the most efficient systems can be relatively high.

In such heat-storage systems the water stratifies into layers, with relatively warm water on top and relatively cool water underneath. The prior-art arrangements therefore have a large surface between the warm and cool layers, with a corresponding large area for conduction of heat between the layers.

OBJECTS OF THE INVENTION

It is an object of the present invention to provide an improved method of and system for storing heat.

Another object is an improved reservoir system for storing heat energy in water and a method of operating such a reservoir system.

Yet another object is the provision of such a method and system which considerably reduce heat losses.

SUMMARY OF THE INVENTION

These objects are attained according to the present invention in a system wherein the reservoir is subdivided by a plurality of upright partitions into a plurality of separate compartments. Means is provided for introducing or withdrawing relatively warm water into the upper region of each of the compartments.

In accordance with the present invention the upper regions of the one end compartment is connected via a conduit to the lower region of the adjoining compartment so that a temperature gradient exists across the reservoir from each compartment to the next, with the furthest downstream compartment being the warmest and the furthest upstream compartment being the coolest. During heating periods the water is drawn off from the lower part of the cold end of the reservoir, heated, and returned to the upper region of the hot end of the reservoir. When the heat energy in the water is being exploited the water is drawn off the upper region of the hot end of the reservoir, its heat energy is extracted, and then it is returned to the lower region of the cool end of the reservoir.

Thus with the system according to the present invention the area of the surface between the warm-water and cool-water layers is reduced considerably. In this manner the equalization of temperature within the reservoir is forestalled and, therefore, the warm water remains at a higher temperature for a longer time so that the extraction of its heat energy is facilitated.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
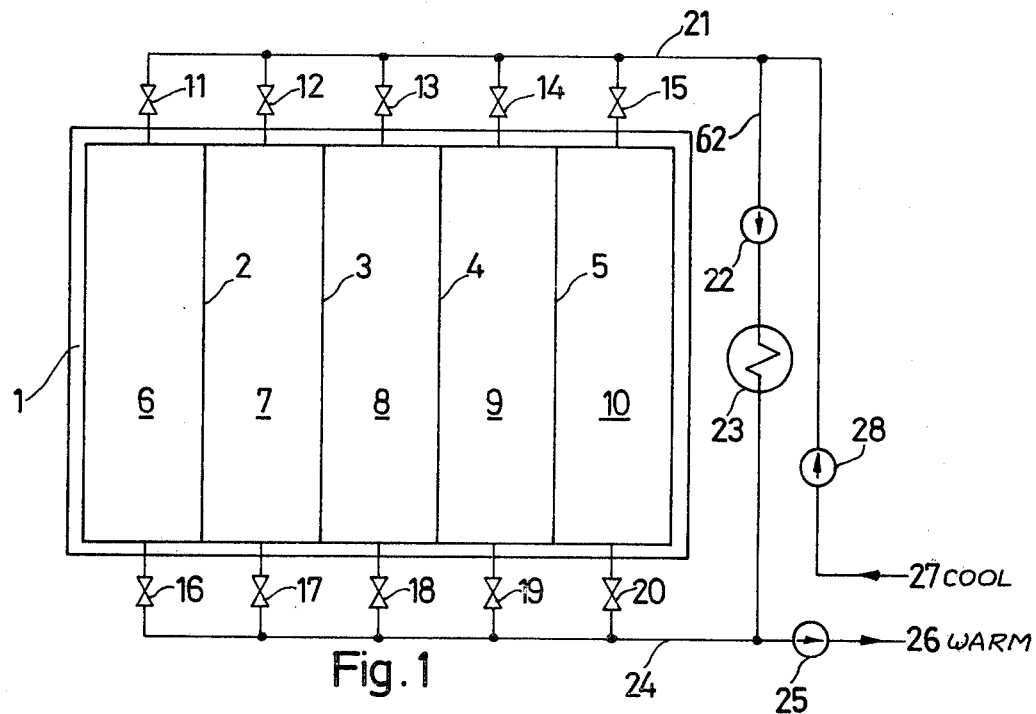
FIGS. 1 and 2 are top schematic views illustrating reservoirs in accordance with this invention.
Figure 4:
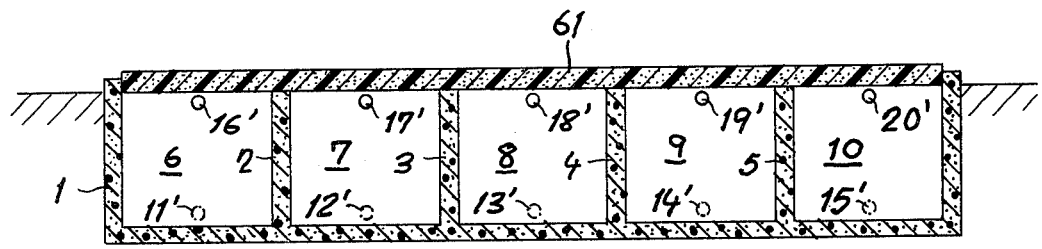
FIG. 4 is a vertical section through the reservoir of FIG. 1.

As shown in FIGS. 1 and 4 a body of water is contained in a dam or reservoir 1 subdivided by four upright partitions 2–5 into five compartments 6–10. An insulating cover 61 overlies the reservoir 1 and prevents heat and fluid loss from this reservoir. At the extreme lower region of each of the compartments 6–10 there is provided a respective cold-water conduit 11'–15' controlled by a respective valve 11–15 and connected to a common cold-water line 21. The top of each of the compartments 6–10 is connected to a respective warm-water conduit 16'–20' controlled by a respective valve 16–20 and all connected to a common warm-water line 24. A shunt line 62 extends between the lines 21 and 24 and is provided with a pump 22 and a heat exchanger 23. My above-cited copending application describes such a heat exchanger which is usable to heat water by solar energy. In addition the cold water and warm water conduits 24 and 21 are provided with respective pumps 25 and 28 and are connected to respective supplies 26 and 27. A load, such as a household heating plant, is connected between the points 26 and 27.

With the system shown in FIGS. 1 and 4 heat is stored in water during the warm season or sunny hours by opening one of the valves 11–15 and one of the corresponding valves 16–20 while operating the pump 22 so as to draw cool water out of the lower region of one of the compartments 6–10 and reintroduce it as warm water back into the same compartment at the upper region thereof. During this operation or instead of this heating operation it is possible to operate either or both of the pumps 25 and 28 so as to pull off or drive off warm water in order to exploit its heat energy.

Figure 2:
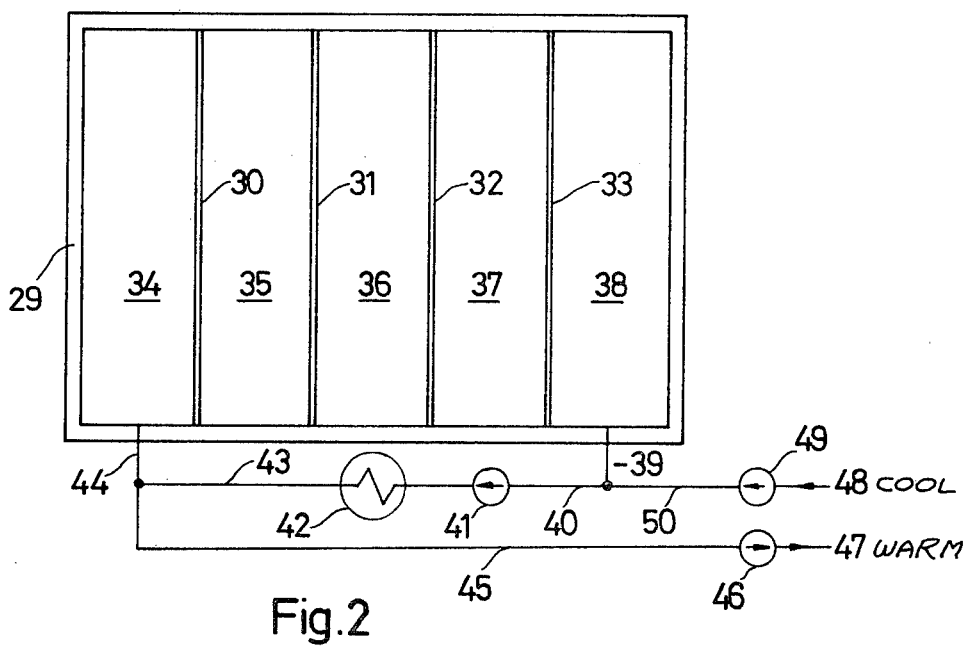
Figure 3:
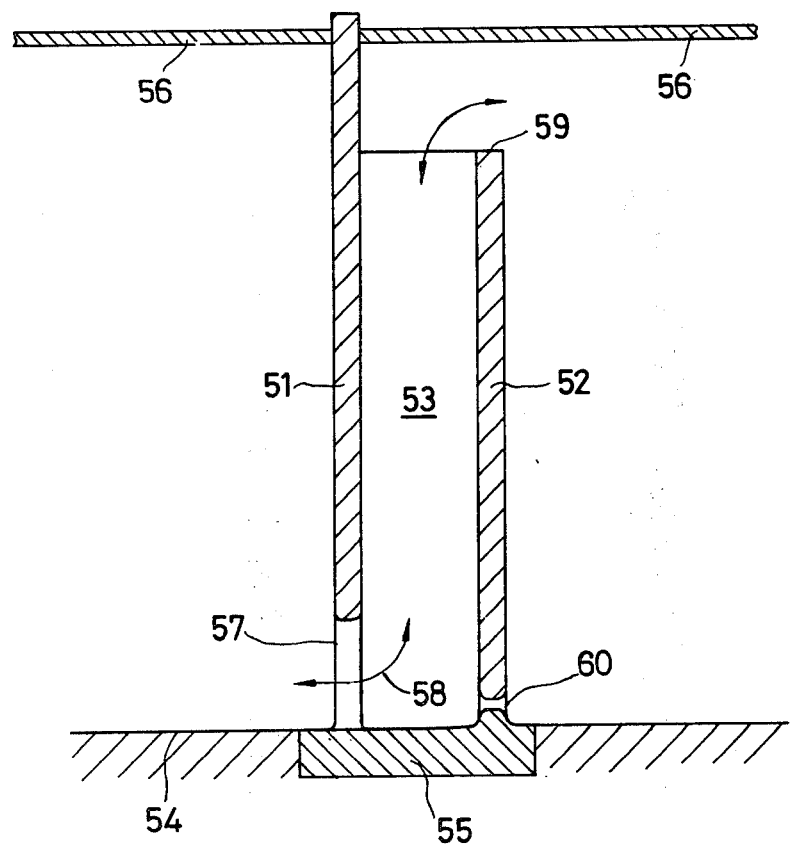
FIG. 3 is a large-scale vertical section taken through a detail of the system of FIG. 2.

The arrangement shown in FIGS. 2 and 3 has a reservoir 29 provided with four partitions 30–33 subdividing it into five compartments 34–38. Cool water from a source 48 can enter the system through a pump 49 and a conduit 50 to an inlet 39 at the bottom of the upstream-end compartment 38. Similarly warm water may be drawn off through a conduit 44 from the top region of the downstream-end compartment 34 and exit to a load 47 through a pipe 45 and a pump 46. A shunt conduit 40 connects the lines 39 and 50 to a pump 41 and heat exchanger 42 in turn connected through a shunt conduit 43 to the outlet line 44, 45.

The compartments 34–38 are separated from one another by like walls as indicated in FIG. 3. A main wall 51 extends from a footing 55 in the base 54 of the reservoir all the way up through the cover 56 on the reservoir and is formed adjacent its base with a horizontally elongated opening 57. Another wall 52 is provided adjacent and parallel to the wall 51 and terminates at its upper end 59 well below the cover 56 and the upper surface of the body of water on which this cover floats. This wall 52 defines with the wall 50 a vertical conduit 53 starting at the opening 57 and terminating at the upper edge 59 so that water may pass between adjoining compartments as is indicated by arrow 58. A small hole 60 is provided adjacent the base of the wall 52 in order to allow the reservoir to be completely drained.

With the system of FIGS. 2 and 3 a temperature gradient exists between each of the compartments 34–38 and the adjoining compartments. Thus the water in the compartment 38 will be substantially cooler than that in compartment 37, which itself is substantially cooler than that in compartment 36, and so on, with the water in compartment 34 being the warmest in the reservoir. This arrangement greatly facilitates the exploitation of the heat stored in the water, since only the warmest water in the warmest compartment is employed, thereby allowing the user to operate with maximum efficiency using the greatest possible temperature differential. In addition the heat loss from overlying layers to underlying layers due to conduction through the water is minimized by reducing the cross-sectional area of the column of water being used, since the reservoir 29 effectively is holding a column of water having a height equal to five times the reservoir depth. The hole 60 is dimensioned of such small cross-sectional area that it has virtually no effect on the operation of the reservoir.

I claim:

1. A system for storing heat, said system comprising:
   a large reservoir adapted to hold a body of water for storage of heat in one season and release at another season;
   an insulating cover over said water in said reservoir, said cover preventing the loss of heat from said water in said reservoir at the top of said body of water;
   a plurality of upright partitions in said reservoir subdividing same into a plurality of separate compartments;
   means opening into the lower region of each compartment for introducing relatively cool water into and withdrawing same from said compartment;
   conduit means opening into the upper region of each of said compartments for introducing relatively warm water into and withdrawing same from said compartments;
   a heat exchanger in said conduit means externally of said reservoir for introducing warm water into said compartments;
   a cool-water conduit and a plurality of valves each connected to a respective compartment and to said means for introducing and for withdrawing said cool water; and
   a warm-water conduit and a plurality of valves each connected to a respective compartment and constituting said conduit means, the cold and warm water conduits opening into the respective compartments through the respective valves on opposite sides of said reservoir.

* * * * *